United States Patent [19]
Ebner et al.

[11] Patent Number: 5,429,667
[45] Date of Patent: Jul. 4, 1995

[54] PROCESS FOR THE RECOVERY OF CARBON DISULFIDE FROM A STEAM/CARBON DISULFIDE MIXTURE

[75] Inventors: Karl Ebner, Oberursel, Germany; Manfred Zeilinger, Timelkam, Austria

[73] Assignee: Ebner & Co. KG Anlagen und Apparate, Eiterfeld, Germany

[21] Appl. No.: 194,508

[22] Filed: Feb. 10, 1994

[30] Foreign Application Priority Data

Feb. 15, 1993 [DE] Germany .................. 43 04 510.3

[51] Int. Cl.6 .................................. B01D 5/00
[52] U.S. Cl. .................................. 95/187; 55/223; 55/228; 55/267; 95/225; 95/235; 95/288
[58] Field of Search ............. 95/235, 187, 288, 225; 55/223, 228, 229, 267; 423/243.01, 242.1

[56] References Cited

U.S. PATENT DOCUMENTS

| | | | |
|---|---|---|---|
| 4,088,735 | 5/1978 | Bratzler et al. | 95/235 X |
| 4,106,917 | 8/1978 | Fields et al. | 95/235 X |
| 4,115,081 | 9/1978 | Ohno et al. | 95/235 X |
| 4,177,250 | 12/1979 | Irvin et al. | 95/235 X |
| 4,780,115 | 10/1988 | Ranke | 95/235 X |
| 4,828,768 | 5/1989 | Talmor | 55/223 X |

FOREIGN PATENT DOCUMENTS 1224928  3/1971  United Kingdom ............ 95/235

*Primary Examiner*—Richard L. Chiesa
*Attorney, Agent, or Firm*—Bacon & Thomas

[57] ABSTRACT

In the process for recovering carbon disulfide from a steam/carbon disulfide mixture, which is produced when the wastewater from the yarn cutters and the suspension water are treated with steam during the manufacture of viscose rayon, the vapors so produced are cooled by means of a liquid spray, drawn out of the vapor condenser and then condensed. The non-condensable constituents are removed via a trap and the liquefied carbon disulfide is separated from the remaining water. Specifically, the liquid used to spray the vapors is preheated by the thermal energy recovered from the cooling of these vapors, and the hot water thus obtained is then used for other purposes.

20 Claims, 1 Drawing Sheet

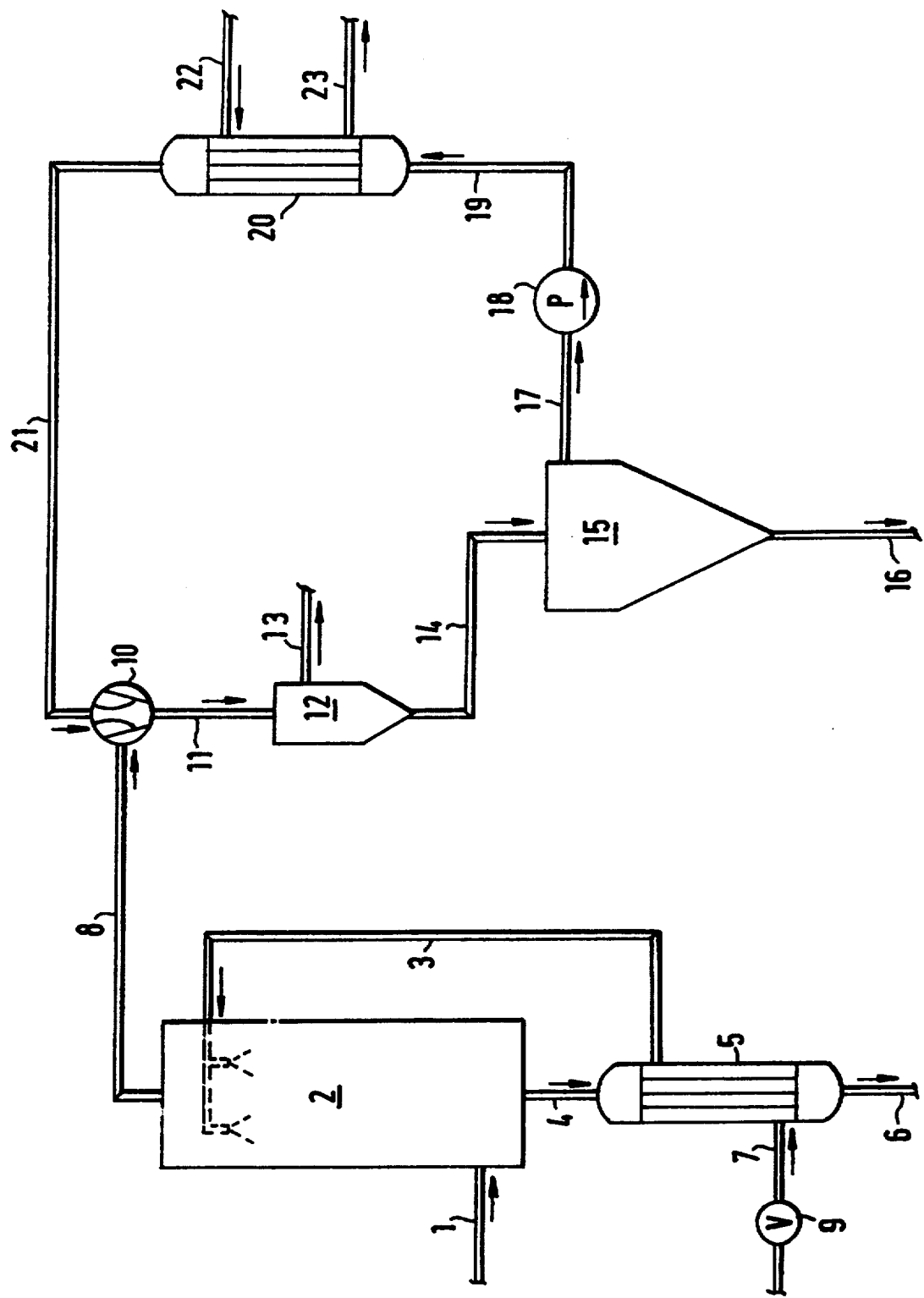

PROCESS FOR THE RECOVERY OF CARBON DISULFIDE FROM A STEAM/CARBON DISULFIDE MIXTURE

BACKGROUND OF THE INVENTION

The present invention concerns a process for the recovery of carbon disulfide from a steam/carbon disulfide mixture which is produced, in particular, in the manufacture of viscose rayon when the wastewater from the yarn cutters and the suspension water are treated with steam.

The wastewater from the yarn cutters and the suspension water produced in the manufacture of viscose rayon are diverted into a trough where they are collected. In this collection trough, said waste water is treated with steam at temperatures of approximately 98° C. The steam/$CS_2$ mixture so generated is then drawn off.

It is known that carbon disulfide is recovered from the steam/$CS_2$ mixture by using a heat-exchanging process to condense the steam, after which the carbon disulfide contained in the steam is obtained through subsequent cooling to the point of condensation.

In the prior art it is standard practice to draw in and convey the steam/$CS_2$ mixture at a temperature of approx. 98° C. using water or another suitable coolant in a parallel-flow configuration. This causes a portion of the steam to condense, while the remaining gas mixture is fed to a carbon disulfide condenser or an activated charcoal absorption system.

The coolant, which simultaneously acts as the means of conveyance, is warmed to temperatures of 50° to 70° C. by the high temperature of the steam/$CS_2$ mixture. The temperature increase of the coolant depends on the pressure loss in the system, since the volume of coolant to be supplied varies as a function of the pressure loss.

One disadvantage of this process is that the mean is of conveyance is simultaneously the coolant. As a result, a very large quantity of liquid, which is heated by the steam/$CS_2$ mixture to a temperature which depends on the pressure loss in the system, must subsequently be cooled down to the point of condensation. Cooling such a large quantity of liquid requires a great deal of energy. Another disadvantage of this known process is that relatively large quantities of liquid are required and must be moved.

SUMMARY OF THE INVENTION

Based on the current state of the art, the purpose of the present invention is to provide a process which recovers carbon disulfide from a steam/carbon disulfide mixture much more economically. In other words, a process for recovering carbon disulfide from a steam/carbon disulfide mixture which requires the condensation of substantially smaller quantities of liquid and which is much more economical in terms of the energy required.

This objective is achieved through a process for the recovery of carbon disulfide from a steam/carbon disulfide mixture, characterized in that the vapors (steam/$CS_2$ mixture) are sprayed by a liquid, specifically water, in a heat exchanger, and are thus cooled, the gas mixture which then remains is drawn off and at least partially condensed using a liquid jet apparatus and a coolant, specifically cold water, and the non-condensable gases are separated from the coolant and the condensed carbon disulfide is removed from the coolant.

The principle on which the invention is based is the cooling of the vapors coming out of the collection trough containing the suspension water and the wastewater from the yarn cutters by a liquid, specifically water, in a counterflow configuration. The vapors are cooled by spraying the steam/$CS_2$ mixture with the supplied liquid inside a heat exchanger, specifically a vapor condenser.

BRIEF DESCRIPTION OF THE DRAWING

The drawing shows a block diagram of the process system in accordance with the invention for recovering carbon disulfide from a steam/carbon disulfide mixture which is produced when the wastewater from the yarn cutters and the suspension water for the yarn are treated with steam.

DETAILED DESCRIPTION OF THE PREFERRED EMBODIMENTS

According to a preferred embodiment of the invention, this liquid and the steam/$CS_2$ mixture are supplied in a counterflow configuration.

According to a preferred embodiment of the invention, the liquid used for spraying, i.e. the spray for the heat exchanger—specifically a vapor condenser—which is used to cool the vapors from the collection troughs is preheated to the point that its temperature is at least as high as the boiling point of carbon disulfide at the partial pressure which exists within the gas mixture when it enters the vapor condenser. The temperature must be high enough to ensure that no carbon disulfide condensation takes place inside the vapor condenser, since dissolved carbon disulfide in the hot water leaving the vapor condenser could limit the further usefulness of the water. If the hot water were to contain dissolved carbon disulfide, the number of potential uses for it would be limited.

According to another preferred embodiment of the invention, the hot water discharged from the vapor condenser is used to preheat the liquid to be supplied to the vapor condenser. In this manner, thermal energy is recovered from the discharged hot water and, preferably through the use of a heat exchanger, transferred to the liquid to be supplied. An advantage of this process is the recovery of thermal energy from the liquid used to cool the vapors, resulting in substantial energy savings at this step in the process.

The remaining, cooled gas mixture is drawn out of the vapor condenser and then condensed in a liquid jet apparatus, specifically a cold-water jet apparatus, using a coolant. The optimum coolant is cold water at a temperature of between 3° and 10° C., more specifically at a temperature of approx. 5° C. At this step in the process the cold water used in the jet apparatus acts as the means of conveyance for the gas which is drawn in, condensing over 99% of the carbon disulfide contained in the gas, as well as some of the steam, depending on the air content of the gas.

The amount of water and/or the pressure required to operate the cold-water jet apparatus are calculated such that the resistance of all the equipment and systems through which the water must flow is overcome.

The condensation of the carbon disulfide gas inside the cold-water jet apparatus also raises the temperature of the cold water by 2° to 3° C.

Following condensation of the carbon disulfide in the liquid jet apparatus, the coolant, cold water, also called the process water, is fed into a container. There the gases which are still present in the process water are separated and drawn off. According to a preferred embodiment of the invention, a trap is used for this purpose.

The process water, which is now free of gases, is fed into another container, specifically a separator, so that the entrained liquid carbon disulfide portion can be separated from the remaining liquid. The separated carbon disulfide is removed from this container. The carbon disulfide is deposited in the bottom of the tank, and is drawn off periodically or continuously. The remaining liquid, i.e. water, is drawn off.

According to a preferred embodiment of the invention, the remaining process water is returned to the cold-water or process-water circuit and re-cooled prior to being supplied to the liquid jet apparatus.

The invention is described in greater detail below using one embodiment in conjunction with a drawing.

The drawing shows a block diagram of the process system in accordance with the invention for recovering carbon disulfide from a steam/carbon disulfide mixture which is produced when the wastewater from the yarn cutters and the suspension water for the yarn are treated with steam.

The carbon disulfide is recovered from this steam/carbon disulfide mixture by cooling the mixture, then condensing the vapors, and subsequently separating out the condensed and non-condensed constituents.

The vapors from the collection trough for the wastewater from the yarn cutters and the suspension water for the yarn, which are at a temperature of approx. 98° to 100° C., are fed into vapor condenser 2 via conduit 1, sprayed or sprinkled with water supplied via line 3 in a counterflow configuration, and thus cooled.

The water is supplied via valve 9 and a line 7, which feed the water into heat exchanger 5 where it is heated by the warmed spray or wash water flowing out of vapor condenser 2 through line 4. The room-temperature water supplied via line 7 is preheated in heat exchanger 5 to a temperature of approx. 35° to 40° C. This preheated water is then carried by conduit 3 into vapor condenser 2 where it is used in a counterflow configuration to spray and cool the vapors injected through conduit 1. The spray water, i.e. the supplied liquid, heats up as the counterflowing vapor cools down, and reaches a temperature of approx. 90° C. The heated water is removed from vapor condenser 2 through conduit 4, and is fed into heat exchanger 5. This water then loses some of its heat to the spray water or wash water which is supplied via control valve 9 through line 7, and is drawn off via conduit 6 to be used for other purposes.

A cold-water jet apparatus 10 draws the cooled vapors or the remaining gas mixture from vapor condenser 2 through conduit 8.

The cold-water jet apparatus operates at a maximum cold-water temperature of 10° C., and condenses the infed gas mixture in the water such that more than 99% of the carbon disulfide is liquefied, depending on the air content of the gas. Of course, water quantity and pressure are also selected appropriately.

From the water jet apparatus 10, the gas/water mixture is diverted via line 11 into trap 12. In this trap 12, the non-condensable gases are separated from the cold water and released to atmosphere via conduit 13. The cold water containing the liquefied carbon disulfide is drained out of trap 12 via conduit 14 and fed to a carbon disulfide separator 15. The carbon disulfide collects in the bottom of the separator and is drawn off periodically or continuously via conduit 16. Separator 15 has an overflow through which the remaining water flows into conduit 17 and is continuously pumped by pump 18 through conduit 19 to heat exchanger 20. Heat exchanger 20 is supplied with refrigerant or refrigerated brine through conduits 22 and 23, thereby cooling the remaining water to a temperature of $\leq 10°$ C. as it passes through heat exchanger 20. The cooled water is then returned to water jet apparatus 10 through line 21.

We claim:

1. A process for the recovery of carbon disulfide from a steam/carbon disulfide mixture, wherein vapors of a steam/$CS_2$ mixture are sprayed by a liquid, in a heat exchanger, and are thus cooled, the gas mixture which then remains is drawn off and at least partially condensed using a liquid jet apparatus and a coolant, and the non-condensable gases are separated from the coolant and the condensed carbon disulfide is removed from the coolant.

2. A process according to claim 1, wherein the liquid used to spray the vapors is preheated to a temperature that is high enough to prevent condensation of the $CS_2$.

3. A process according to claim 2, wherein the temperature, the quantity and/or the pressure of the coolant employed are at levels so as to completely condense the carbon disulfide.

4. A process according to claim 2 wherein the vapors and the liquid used to spray the vapors are supplied in a counterflow configuration.

5. A process according to claim 4, wherein the temperature, the quantity and/or the pressure of the coolant employed are at levels so as to completely condense the carbon disulfide.

6. A process according to claim 2, wherein the liquid used to spray the vapors is preheated by the liquid flowing out of the heat exchanger.

7. A process according to claim 6 wherein the vapors and the liquid used to spray the vapors are supplied in a counterflow configuration.

8. A process according to claim 6, wherein the temperature, the quantity and/or the pressure of the coolant employed are at levels so as to completely condense the carbon disulfide.

9. A process according to claim 1 wherein the vapors and the liquid used to spray the vapors are supplied in a counterflow configuration.

10. A process according to claim 1, wherein the temperature, the quantity and/or the pressure of the coolant employed are at levels so as to completely condense the carbon disulfide.

11. A process according to claim 1, wherein, water at a temperature of 3° to 10° C. is used as the coolant.

12. A process according to claim 11, wherein the water temperature is approximately 5° C.

13. A process according to claim 1, wherein the coolant used to condense the gaseous mixture flows back in a return loop, and is re-cooled.

14. A process according to claim 1, wherein the non-condensable gases are removed from the coolant via a trap.

15. A process according to claim 14, wherein the liquid discharged from the trap is fed into a separator to remove the carbon disulfide, with the remaining liquid being re-injected into the liquid circuit.

16. A process according to claim 1, wherein the steam/carbon disulfide mixture used is that which is produced in the manufacture of viscose rayon when the wastewater from the yarn cutters and the suspension water are treated with steam.

17. A process according to claim 1, wherein the liquid used to spray the mixture is water.

18. A process according to claim 17, wherein the coolant is cold water.

19. A process according to claim 18, wherein the temperature of the coolant is from 3° to 10° C.

20. A process according to claim 1 wherein the coolant is cold water.

* * * * *